(12) United States Patent
Hsieh

(10) Patent No.: US 7,011,372 B1
(45) Date of Patent: Mar. 14, 2006

(54) MODULAR CHAIR ASSEMBLY

(75) Inventor: Duan-Cheng Hsieh, Taipei (TW)

(73) Assignee: Habitex Corporation, Taipei (TW)

( * ) Notice: Subject to any disclaimer, the term of this patent is extended or adjusted under 35 U.S.C. 154(b) by 0 days.

(21) Appl. No.: 10/961,000

(22) Filed: Oct. 8, 2004

(51) Int. Cl.
*A47C 4/00* (2006.01)

(52) U.S. Cl. .............................. 297/440.24; 297/16.1; 297/45; 403/195

(58) Field of Classification Search ........... 297/440.11, 297/45, 452.56, 452.13, 440.24; 5/186.1; 248/188, 188.5; 403/292, 293, 294, 341, 403/195, 196
See application file for complete search history.

(56) References Cited

U.S. PATENT DOCUMENTS

| | | | | |
|---|---|---|---|---|
| 2,723,712 A | * | 11/1955 | Maxwell | 297/440.11 |
| 2,733,755 A | * | 2/1956 | Yellen | 297/452.13 |
| 3,180,685 A | * | 4/1965 | Rogalski et al. | 248/188 |
| 3,532,369 A | * | 10/1970 | Reilly | 403/176 |
| 3,694,030 A | * | 9/1972 | Grosfillex | 297/452.23 |
| 3,899,210 A | * | 8/1975 | Samhammer et al. | 297/452.17 |
| 4,139,192 A | * | 2/1979 | McNeil | 403/293 |
| 4,452,444 A | * | 6/1984 | Schulze, Jr. | 5/186.1 |
| 5,915,782 A | * | 6/1999 | Geldbaugh | 297/45 |
| 6,332,646 B1 | * | 12/2001 | Tseng | 297/46 |
| 6,702,371 B1 | * | 3/2004 | Zheng | 297/45 |
| 6,840,573 B1 | * | 1/2005 | Yao | 297/16.1 |
| 6,848,740 B1 | * | 2/2005 | Reese | 297/45 |

FOREIGN PATENT DOCUMENTS

JP         06300018 A   * 10/1994

* cited by examiner

*Primary Examiner*—Peter M. Cuomo
*Assistant Examiner*—Stephen D'Adamo
(74) *Attorney, Agent, or Firm*—Abelman, Frayne & Schwab

(57) ABSTRACT

A modular chair assembly includes a support frame, a leg frame, a link unit, and a seat mounted on the support frame. The support frame includes a plurality of curved supporting tubes, each of which has opposite first and second ends. The first end of each supporting tube is connected detachably to the second end of an adjacent supporting tube. The leg frame supports the support frame on a support surface, and includes a plurality of leg tubes. The link unit detachably connects one end of each leg tube to the first and second ends of two adjacent ones of the supporting tubes.

9 Claims, 10 Drawing Sheets

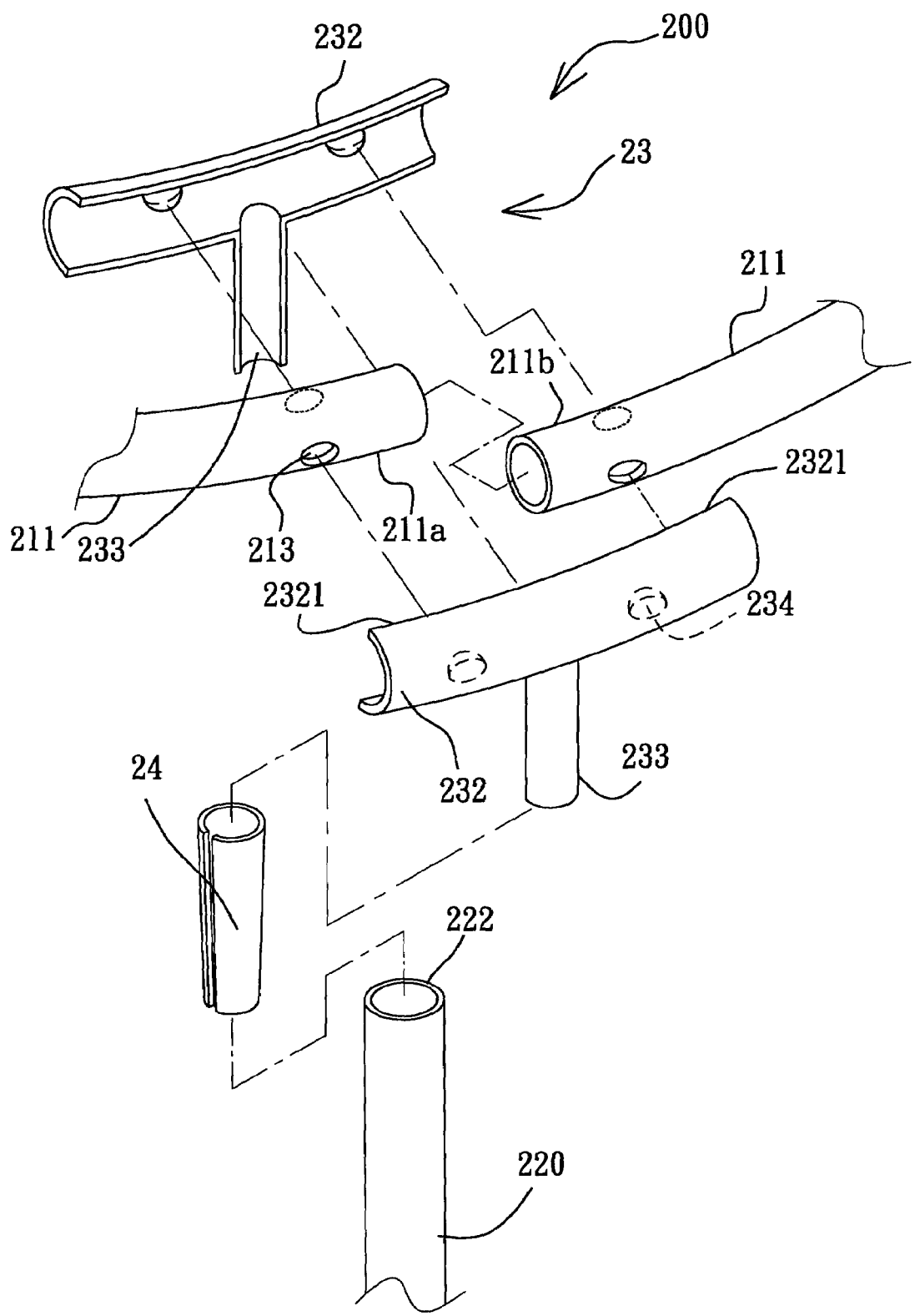
F I G. 7

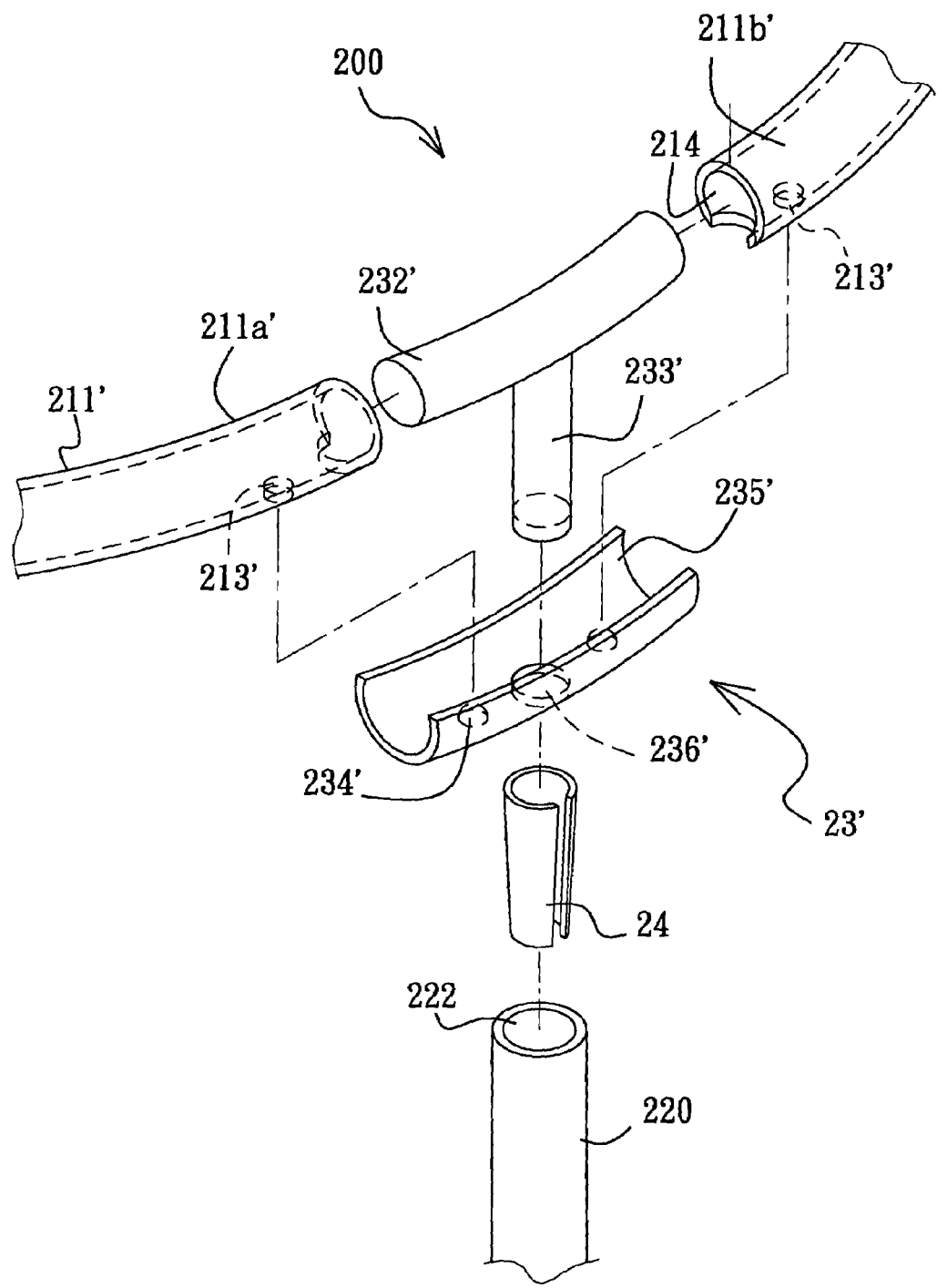
F I G. 9

MODULAR CHAIR ASSEMBLY

BACKGROUND OF THE INVENTION

1. Field of the Invention

The invention relates to a modular chair assembly, more particularly to a modular chair assembly that may be quickly assembled and disassembled.

2. Description of the Related Art

Referring to FIGS. 1 to 3, a conventional chair assembly 100 includes a support frame 11, a pair of intersecting U-shaped legs 12 connected pivotally to the support frame 11 and having a plurality of pin holes 15, and a seat cushion 13 covering the support frame 11. The U-shaped legs 12 are connected to each other by inserting removably and selectively a pin 14 through the corresponding pin holes 15 at each intersecting juncture of the legs 12 so that the chair assembly 100 may be folded and unfolded.

Although in the conventional chair assembly 100 the legs 12 are parallel to each other in the folded state so as to reduce its volume, since the support frame 11 and the U-shaped legs 12 cannot be detached relative to each other, the conventional chair assembly 100 still occupies a substantial space when prepared for transport or storage by folding the chair assembly 100. Furthermore, the support frame 11 is integrally formed, such that the volume it occupies cannot be altered either in the folded or unfolded state of the chair assembly 100. Hence, transport of the conventional chair assembly 100 is inconvenient, and when stored, the chair assembly 100 occupies an inordinate amount of space. Moreover, the pin 14 at each juncture of the legs 12 may easily become detached during folding and unfolding operations of the chair assembly 100. When the pins 14 are misplaced after becoming detached, the conventional chair assembly 100 is rendered useless. Another drawback related to the pins 14 is that repeated use of the chair assembly 100 may result in easy deformation of the pins 14 due to the weight the pins 14 have to bear. When the pins 14 are deformed, the chair assembly 100 cannot be folded. Additionally, the corresponding pin holes 15 at each intersecting juncture of the legs 12 have to be precisely formed so as to receive accurately the respective pin 14. Hence, a high degree of quality control is necessary during production of the conventional chair assembly 100.

SUMMARY OF THE INVENTION

Therefore, the object of the present invention is to provide a modular chair assembly that includes a support frame having a plurality of supporting tubes which are detachably interconnected so as to reduce the volume of the chair assembly when the same is disassembled for transport or storage.

Another object of the present invention is to provide a modular chair assembly that includes a support frame and a leg frame that are connected detachably to each other so as to reduce the volume of the chair assembly when the same is disassembled for transport or storage.

According to this invention, a modular chair assembly comprises a support frame, a leg frame, a link unit, and a seat mounted on the support frame. The support frame includes a plurality of curved supporting tubes, each of which has opposite first and second ends. The first end of each of the supporting tubes is connected detachably to the second end of an adjacent one of the supporting tubes. The leg frame supports the support frame on a support surface, and includes a plurality of leg tubes. The link unit detachably connects one end of each of the leg tubes to the first and second ends of two adjacent ones of the supporting tubes.

BRIEF DESCRIPTION OF THE DRAWINGS

Other features and advantages of the present invention will become apparent in the following detailed description of the preferred embodiments with reference to the accompanying drawings, of which:

FIG. 7 is a fragmentary exploded perspective view of the first preferred embodiment, illustrating how link units interconnect supporting tubes and leg tubes;

FIG. 9 is a fragmentary exploded perspective view of the second preferred embodiment of a modular chair assembly according to the present invention.

DETAILED DESCRIPTION OF THE PREFERRED EMBODIMENTS

Figure 1:
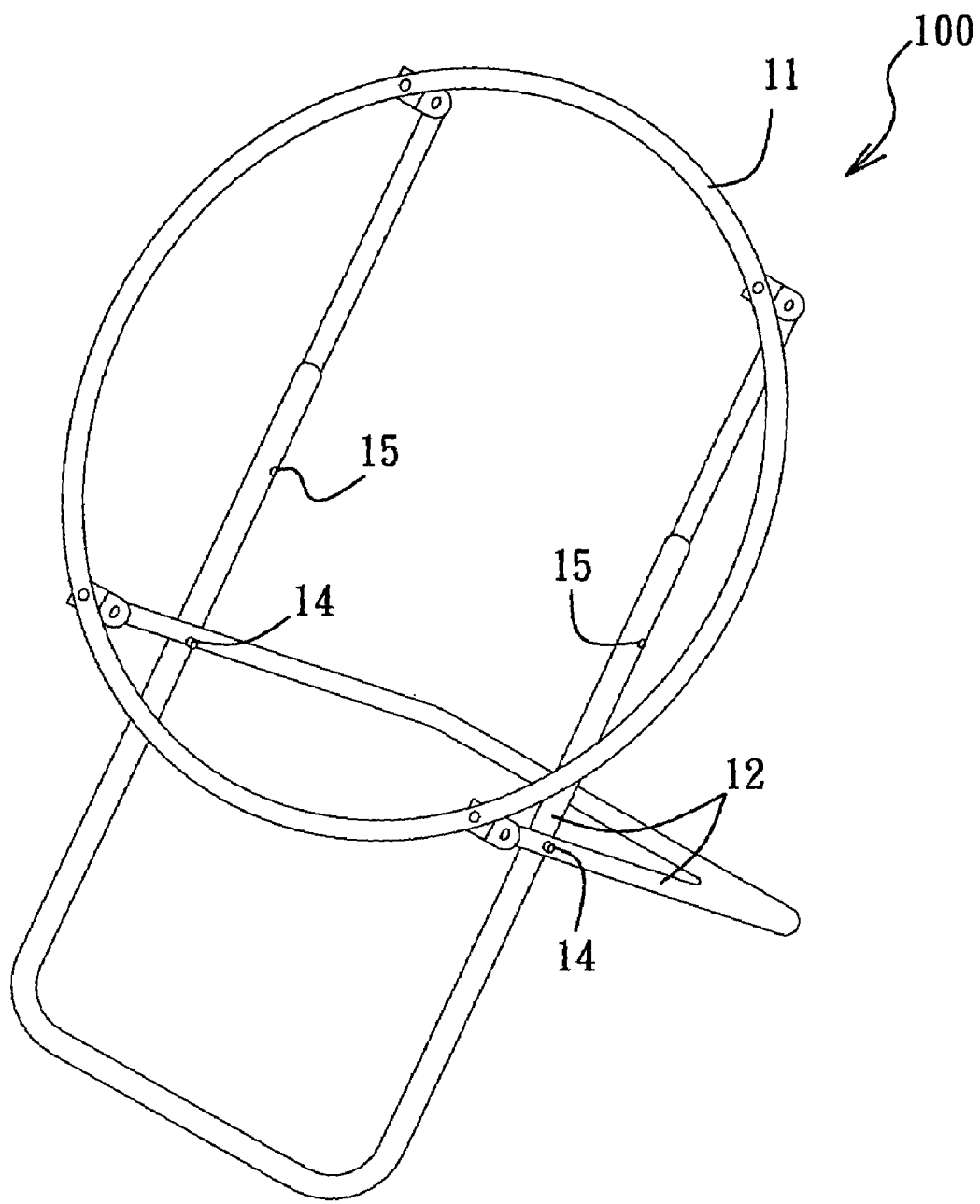
FIG. 1 is a perspective view of a conventional chair assembly.
Figure 2:
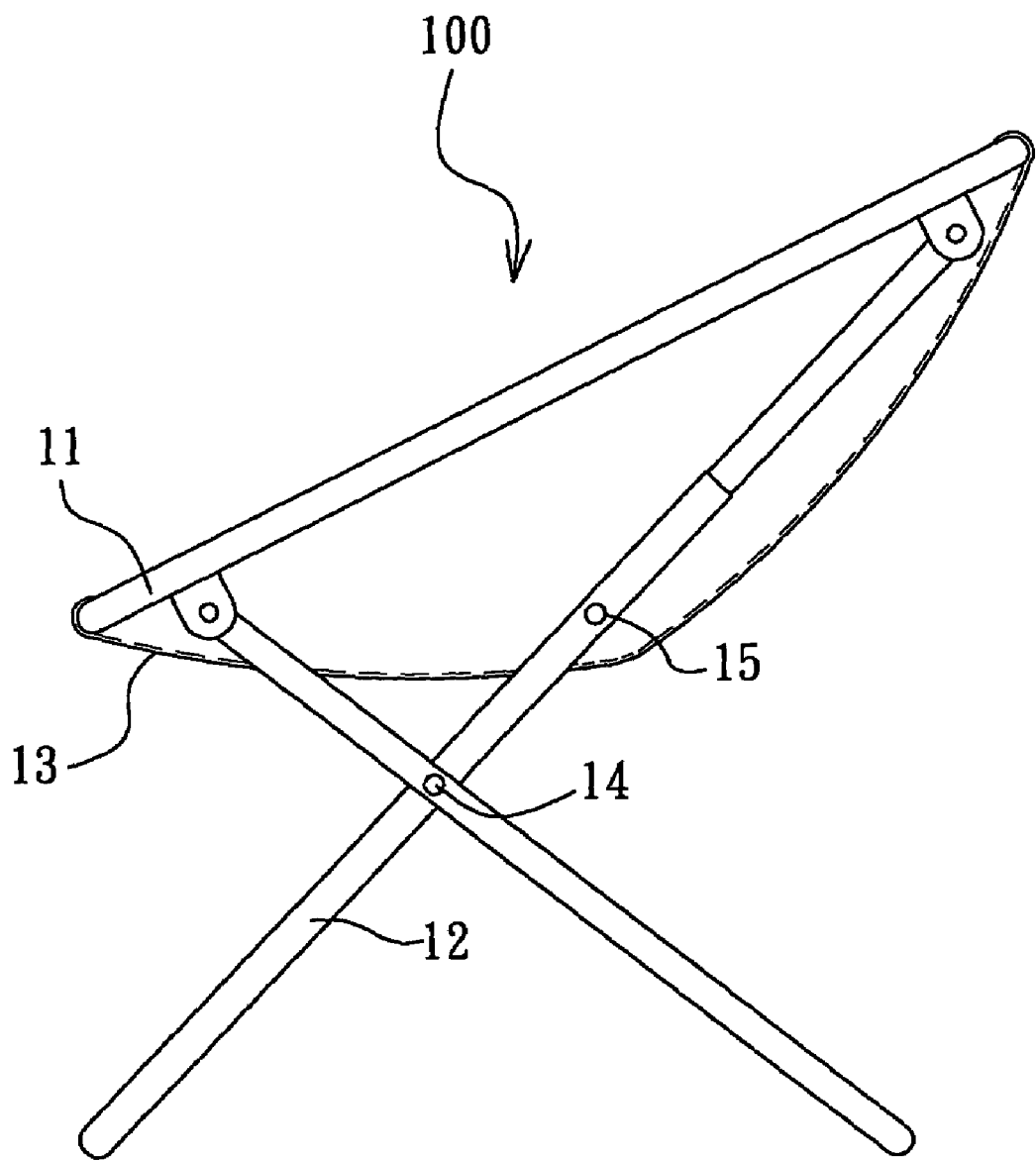
FIG. 2 is a schematic side view of FIG. 1.
Figure 3:
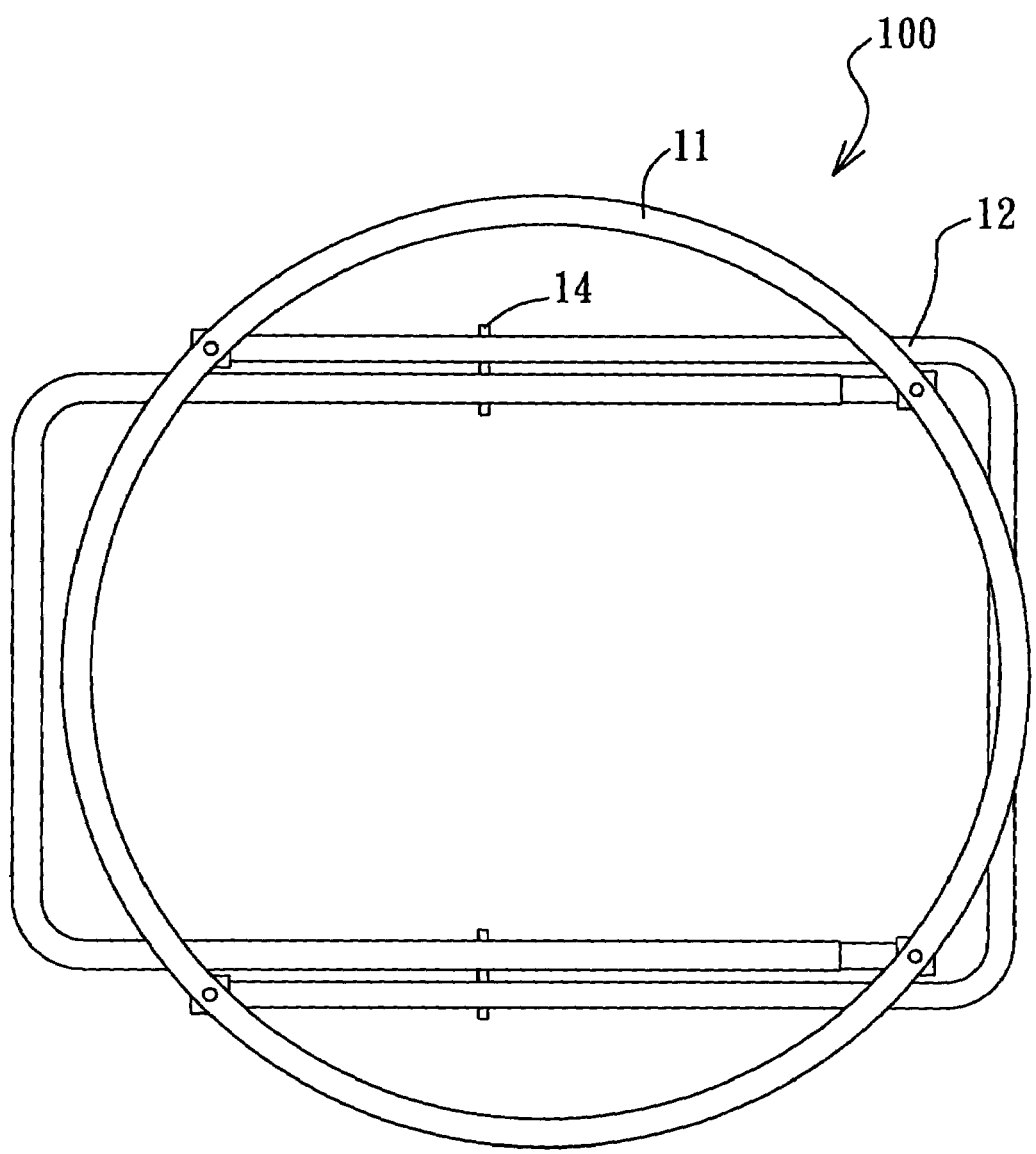
FIG. 3 is a schematic top view of the chair assembly of FIG. 1 in a folded state.
Figure 4:
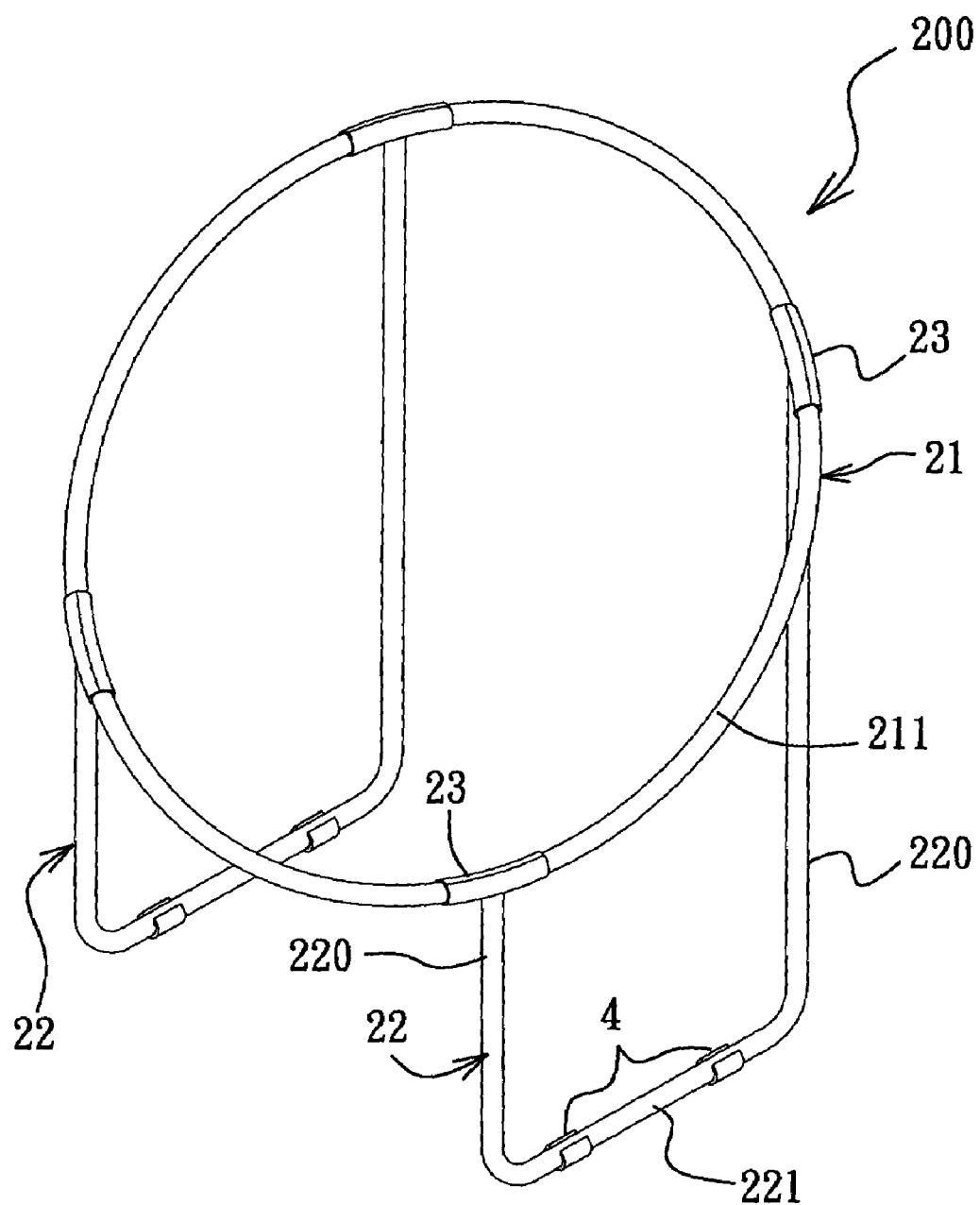
FIG. 4 is a perspective view of the first preferred embodiment of a modular chair assembly according to the present invention.
Figure 5:
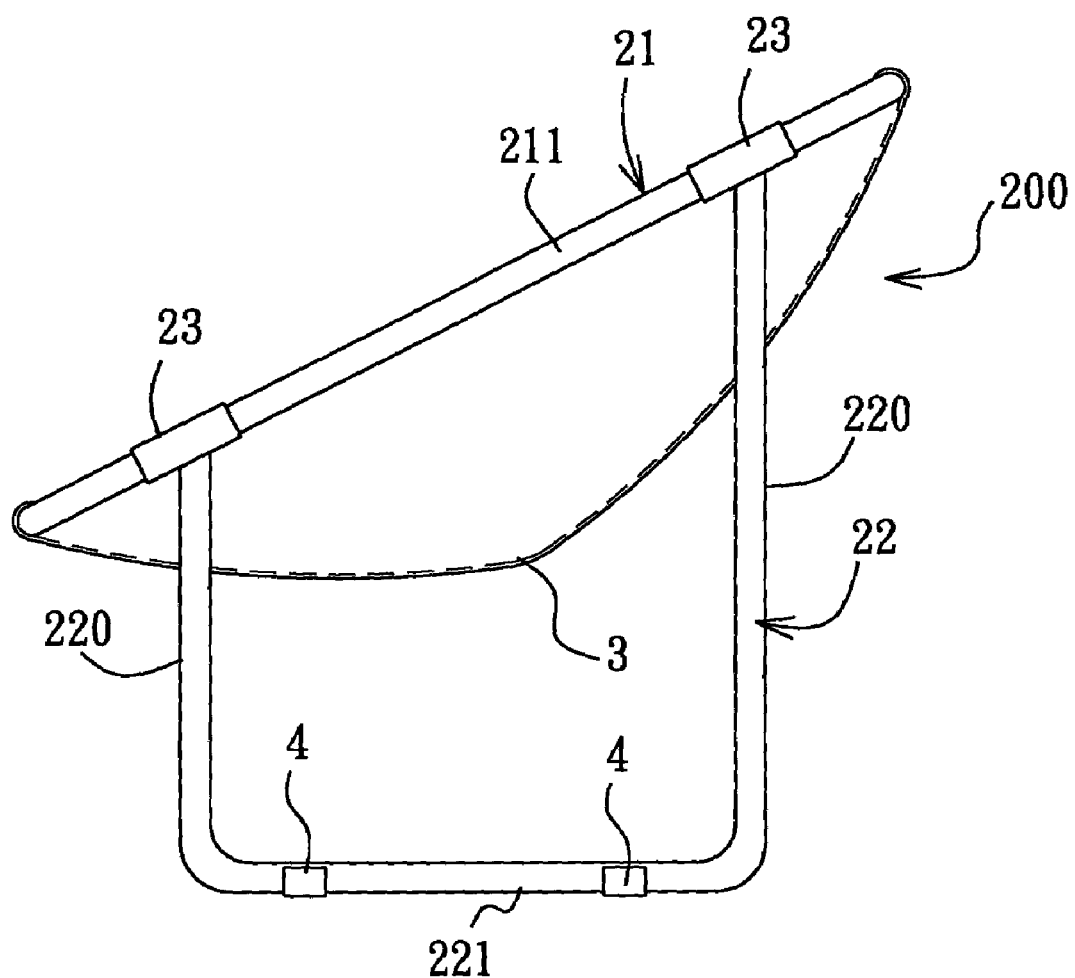
FIG. 5 is a schematic side view of the first preferred embodiment.
Figure 6:
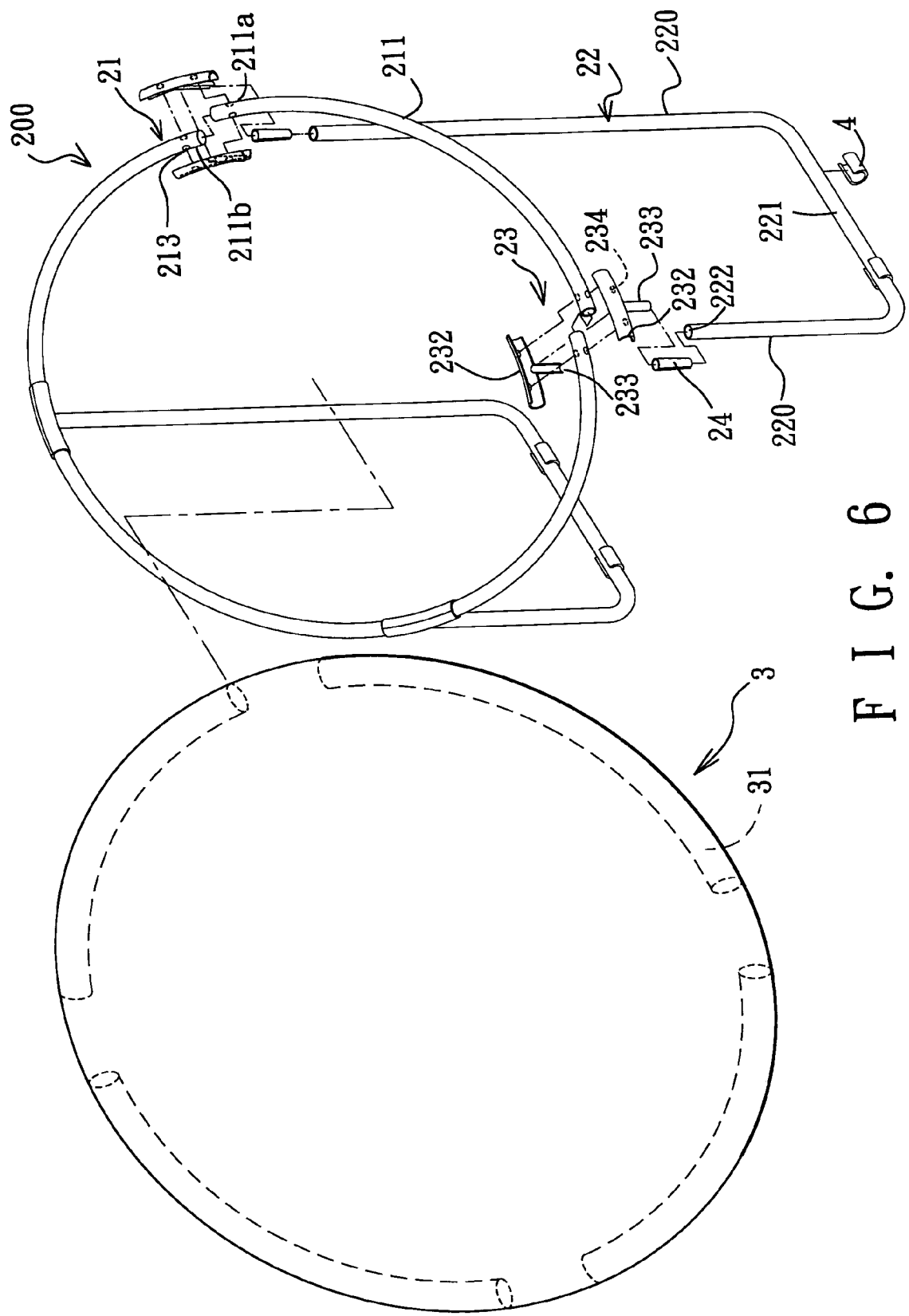
FIG. 6 is a partly exploded perspective view of the first preferred embodiment.

Before the present invention is described in greater detail, it should be noted that like elements are denoted by the same reference numerals throughout the disclosure.

Referring to FIGS. 4 to 7, the first preferred embodiment of a modular chair assembly 200 according to the present invention is shown to comprise a support frame 21, a leg frame 22, four link units 23, and a seat 3.

The support frame 21 includes four supporting tubes 211, each of which has opposite first and second ends 211a, 211b and is a curved tube made of, for example, a metallic or plastic material. The first end 211a of each of the supporting tubes 211 is connected detachably to the second end 211b of an adjacent one of the supporting tubes 211. The supporting tubes 211 are interconnected to define a ring.

The leg frame 22 supports the support frame 21 on a support surface, such as the ground, and includes two pairs of leg tubes 220, and an intermediate cross member 221 interconnecting each pair of the leg tubes 220. Each of the leg tubes 220 has a top end 222 connected to the first and second ends 211a, 211b of two adjacent ones of the supporting tubes 211 through a respective one of the link units 23.

In this embodiment, the supporting tubes 211 and the leg tubes 220 are made of metal. However, they may be made of nonmetal materials, such as wood, plastic, etc. Further, the supporting tubes 211 and the leg tubes 220 may be solid or hollow. If solid, the areas of the top ends 222 of the leg tubes 220 are hollow.

Each of the link units 23 detachably connects the top end 222 of each of the leg tubes 220 to a corresponding pair of the first and second ends 211a, 211b of two adjacent ones of the supporting tubes 211. Each link unit 23 has a leg connecting portion 233, a tube supporting portion 232, and a hollow squeeze member 24. The tube supporting portion 232 is connected transversely to the leg connecting portion 233, and has two opposite ends 2321 that project in opposite directions from the leg connecting portion 233 and that are connected respectively to the first and second ends 211a, 211b of two adjacent ones of the supporting tubes 211. The leg connecting portion 233 extends downwardly from the tube supporting portion 232 so as to connect with one of the leg tubes 220. The hollow squeeze member 24 is inserted into the top end 222 of one of the leg tubes 220. In this embodiment, the hollow squeeze member 24 is made of an elongated plastic tube, and has a substantially C-shaped cross-section. However, the squeeze member 24 may be a rubber tube with a circular cross-section, or any other element able to perform the function described below.

In this embodiment, each of the link units 23 is halved so that each of the leg connecting portion 233 and the tube supporting portion 232 has two halves. The two halves of the tube supporting portion 232 clamp onto the first and second ends 211a, 211b of two adjacent ones of the supporting tubes 211. The two halves of the leg connecting portion 233 are inserted into the squeeze member 24 so that the squeeze member 24 is disposed between the leg connecting portion 233 and the corresponding leg tube 220 so as to enhance engagement between the same.

Each of the link units 23 further includes surface engagement elements provided on the halves of the tube supporting portion 232 and the first and second ends 211a, 211b of two adjacent ones of the supporting tubes 211. The surface engagement elements include interengageable slots 213 and protrusions 234. In this embodiment, each of the first and second ends 211a, 211b of each supporting tube 211 is formed with two diametrically opposed slots 213, while each of the halves of the tube supporting portion 232 is formed with two protrusions 234. One of the protrusions 234 engages a corresponding one of the slots 213 in the first end 211a of one of the supporting tubes 211, and the other one of the protrusions 234 engages a corresponding one of the slots 213 in the second end 211b of an adjacent supporting tube 211 so that the two halves of the tube supporting portion 232 hold firmly the first and second ends 211a, 211b of two adjacent ones of the supporting tubes 211.

To make the modular chair assembly 200 of the present invention more stable, two anti-slip units 4 are provided on the intermediate cross member 221 of each leg frame 22.

In this embodiment, the support frame 21 is ring-shaped. However, it may also be rectangular, in which case the supporting tubes 211 may be straight tubes or rods, or bended tubes or rods, and are not limited to curved metal tubes. Furthermore, the intermediate cross member 221 may be connected integrally to the leg tubes 220.

The seat 3 is mounted detachably on the support frame 21, and has a plurality of angularly spaced-apart sleeve portions 31 at its peripheral edge. The sleeve portions 31 are sewn to form tubular bodies for insertion of the respective supporting tubes 211 therethrough so that the seat 3 is connected to the support frame 21. The sleeve portions 31 are sized such that the first and second ends 211a, 211b of each of the supporting tubes 211 are exposed when the supporting tubes 211 are positioned in the sleeve portions 31.

Figure 8:
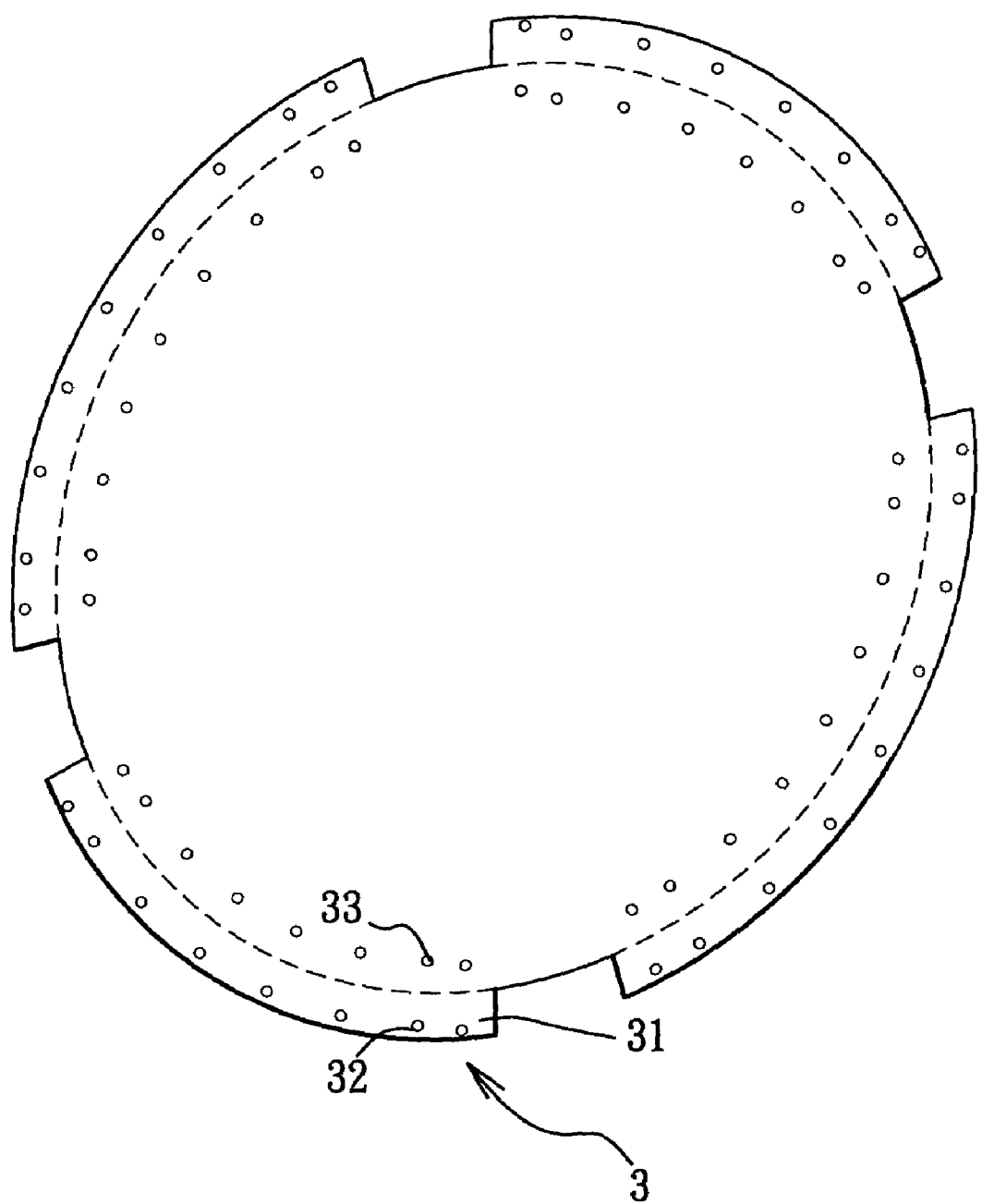
FIG. 8 is a schematic view of an alternative seat of the first preferred embodiment.

However, the sleeve portions 31 of the seat 3 may be replaced by a plurality of male and female snap fasteners 32, 33, as shown in FIG. 8, so as to detachably connect the seat 3 to the support frame 21.

To assemble the modular chair assembly 200 of the present invention, the supporting tubes 211 are first inserted into the respective sleeve portions 31 such that the first and second ends 211a, 211b of each supporting tube 211 are exposed. Next, each link unit 23 is connected to each two adjacent supporting tubes 211 with the two halves of the tube supporting portion 232 clamping onto the first and seconds ends 211a, 211b of the adjacent two of the supporting tubes 211. During this operation, the protrusions 234 of the tube supporting portion 232 engage the respective slots 213 in the first and second ends 211a, 211b of the adjacent two of the supporting tubes 211, thereby firmly holding the supporting tubes 211. The squeeze member 24 of each link unit 23 is then sleeved on the respective leg connecting portion 233. Finally, the squeeze member 24 together with the respective leg connecting portion 233 are inserted into the top end 222 of the respective leg tube 220.

Referring to FIG. 9, the second preferred embodiment of a modular chair assembly 200 according to the present invention is shown to be similar to the first preferred embodiment. However, in this embodiment, each of the link units 23' further includes a curved brace plate 235' which extends along the tube connecting portion 232' and which has a central through hole 236' for extension of the leg connecting portion 233' therethrough. The two ends of the tube supporting portion 232' are inserted respectively into the first and second ends 211a', 211b' of two adjacent ones of the supporting tubes 211'. The leg connecting portion 233' passes through the central through hole 236', and extends into the squeeze member 24 so as to connect with the top end 222 of the respective leg tube 220.

The brace plate 235' and the first and second ends 211a', 211b' of two adjacent ones of the supporting tubes 211' are provided with the surface engagement elements. The surface engagement elements include interengageable slots 213' and protrusions 234'. In this embodiment, each of the first and second ends 211a', 211b' of each supporting tube 211' is formed with a slot 213', while the brace plate 235' is formed with two protrusions 234', each of which is disposed on each side of the central through hole 236'.

After the two ends of the tube supporting portion 232' are inserted respectively into the first and second ends 211a', 211b' of two adjacent ones of the supporting tubes 211', the brace plate 235' is sleeved on the leg connecting portion 233' by pressing the leg connecting portion 233' through the central through hole 236' so as to engage respectively the protrusions 234' with the slots 213' in the first and second ends 211a', 211b' of two adjacent ones of the supporting tubes 211'. The brace plate 235' presses the first and second ends 211a', 211b' of two adjacent ones of the supporting tubes 211', thereby enhancing the interconnections between the supporting tubes 211'.

Thereafter, the squeeze member 24 of each link unit 23' is sleeved on the respective leg connecting portion 233', and, the squeeze member 24 together with the respective leg connecting portion 233' are inserted into the top end 222 of the respective leg tube 220. At this time, the top end 222 of the leg tube 220 pushes the brace plate 235' against the first and second ends 211a', 211b' of two adjacent ones of the supporting tubes 211' so that the brace plate 235' is positioned thereon. The squeeze member 24, aside from providing tightened connection between the leg tube 220 and the respective leg connecting portion 234', may also press the brace plate 235' against the first and second ends 211a', 211b' of two adjacent ones of the supporting tubes 211'.

Figure 10:
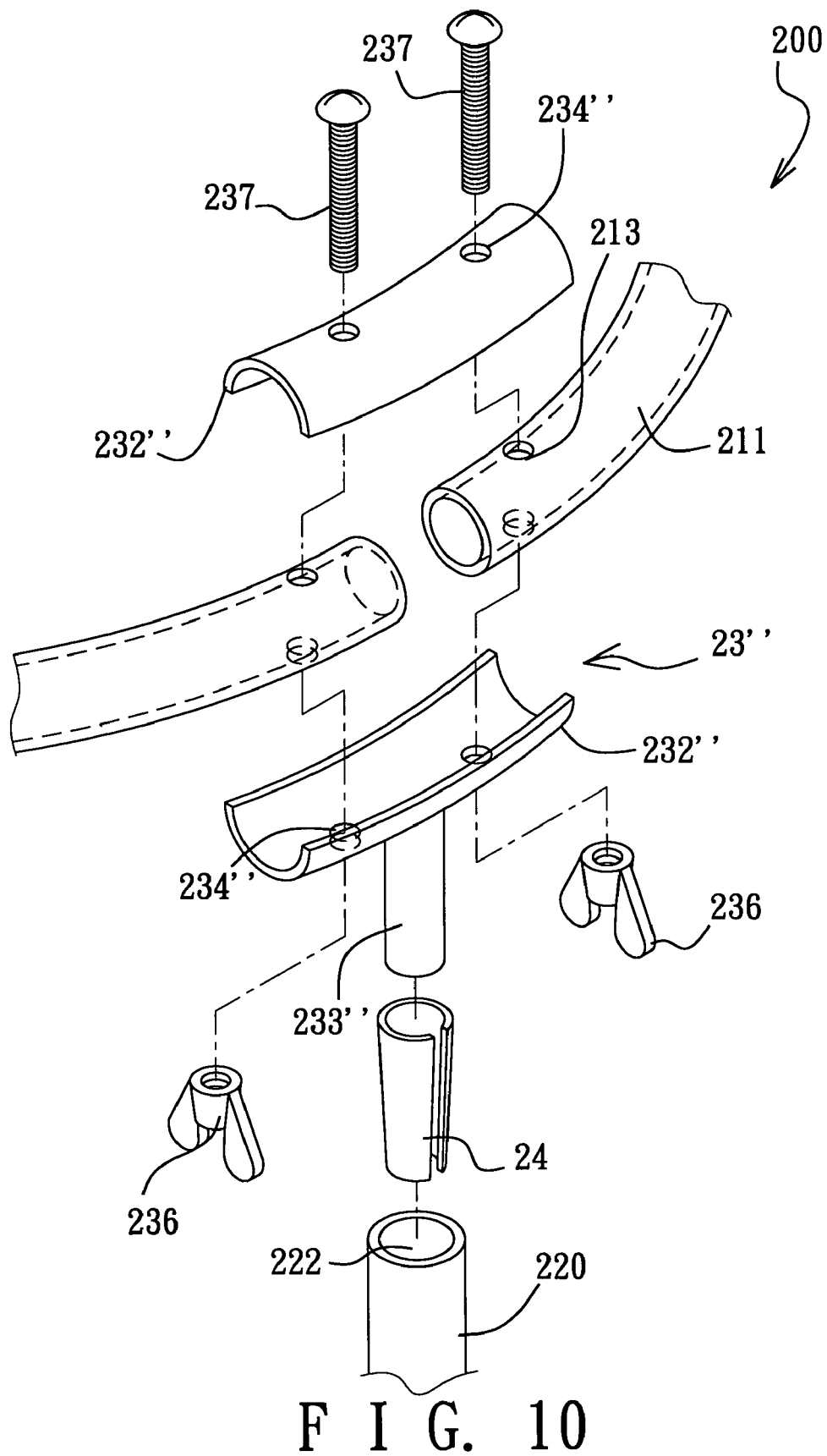
FIG. 10 is a fragmentary exploded perspective view of the third preferred embodiment of a modular chair assembly according to the present invention.

Referring to FIG. 10, the third preferred embodiment of a modular chair assembly 200 according to the present invention is shown to be similar to the first preferred embodiment. However, in this embodiment, the tube supporting portion 232" of each link unit 23" is halved so as to form upper and lower half parts to clamp onto the first and second ends 211a, 211b of two adjacent ones of the supporting tubes 211. Each of the upper and lower half parts of the tube supporting portion 232" is formed with a pair of spaced-apart through holes 234". The leg connecting portion 233" is connected to the lower half part of the tube supporting portion 232". Each of the link units 23" further includes two screws 237 and two wing nuts 236. The screws 237 respectively extend through the through holes 234" in the upper half part of the tube supporting portion 232", the connecting holes 213 in the first and second ends 211a, 211b of two adjacent ones of the supporting tubes 211, and out from the through holes 234" in the lower half part of the tube supporting portion 232". A wing nut 236 is screwed onto a bottom end of a corresponding one of the screws 237, thereby fastening the upper and lower half parts of the tube supporting portion 232" to the first and second ends 211a, 211b of two adjacent ones of the supporting tubes 211. The squeeze member 24 of each link unit 23" is similarly sleeved on the respective leg connecting portion 233", and, the squeeze member 24 together with the respective leg connecting portion 233" are inserted into the top end 222 of the respective leg tube 220.

From the aforementioned description of the preferred embodiments, it is apparent that assembly of the modular chair assembly 200 of the present invention is not only easy and simple, but the time required to perform assembly is also minimized. Furthermore, since no tools or very simple tools in the case of the third preferred embodiment are only necessary to assemble the modular chair assembly 200, assembly and disassembly thereof may be conducted at any desired place. Moreover, since the supporting tubes 211, 211', 211", the link units 23, 23', 23" and the leg tubes 220 are interconnected detachably, the volume of the modular chair assembly 200 of the present invention is substantially reduced after disassembly, so that the modular chair assembly 200 may be easily stored and transported. Additionally, the components of the modular chair assembly 200 of the present invention may be mass-produced so that production costs may be minimized while ensuring a high quality.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A modular chair assembly comprising:
   a support frame including a plurality of curved supporting tubes, each of which has opposite first and second ends, said first end of each of said supporting tubes being connected detachably to said second end of an adjacent one of said supporting tubes;
   a leg frame supporting said support frame on a support surface, and including a plurality of leg tubes;
   a link unit detachably connecting one end of each of said leg tubes to said first and second ends of two adjacent ones of said supporting tubes; and
   a seat mounted on said support frame;
   wherein said supporting tubes are interconnected to define a ring, said leg frame including two pairs of said leg tubes, and an intermediate cross member interconnecting each pair of said leg tubes, each of said leg tubes having a top end connected to said first and second ends of two adjacent ones of said supporting tubes through said link unit,
   wherein said link unit has a leg connecting portion connected to said top end of one of said leg tubes, and a tube supporting portion connected transversely to said leg connecting portion and having two opposite ends projecting in opposite directions from said leg connecting portion, said ends of said tube supporting portion being connected respectively to said first and second ends of two adjacent ones of said supporting tubes; and
   wherein said link unit further includes a hollow squeeze member which has a substantially C-shaped cross-section and which is inserted into one of said leg tubes, said leg connecting portion being inserted into said squeeze member.

2. The modular chair assembly as claimed in claim 1, wherein said link unit is halved so that each of said leg connecting portion and said tube supporting portion has two halves, said two halves of said tube supporting portion clamping onto said first and second ends of two adjacent ones of said supporting tubes, said two halves of said leg connecting portion being inserted into said squeeze member.

3. The modular chair assembly as claimed in claim 2, wherein said link unit further includes surface engagement elements provided on said halves of said tube supporting portion and said first and second ends of two adjacent ones of said supporting tubes.

4. The modular chair assembly as claimed in claim 3, wherein said surface engagement elements include interengageable slots and protrusions.

5. The modular chair assembly as claimed in claim 1, wherein said link unit further includes a brace plate which extends along said tube connecting portion and which has a through hole, said ends of said tube supporting portion being inserted respectively into said first and second ends of two adjacent ones of said supporting tubes, said leg connecting portion passing through said through hole and extending into said squeeze member, said brace plate being pressed against said first and second ends of two adjacent ones of said supporting tubes.

6. The modular chair assembly as claimed in claim 5, wherein said brace plate and said first and second ends of two adjacent ones of said supporting tubes are provided with surface engagement elements for engaging said brace plate with said first and second ends of two adjacent ones of said supporting tubes.

7. The modular chair assembly as claimed in claim 6, wherein said surface engagement elements include interengageable slots and protrusions.

8. The modular chair assembly as claimed in claim 1, wherein said tube supporting portion is halved so as to form upper and lower half parts to clamp onto said first and second ends of two adjacent ones of said supporting tubes, said leg connecting portion being connected to said lower half part of said tube supporting portion.

9. The modular chair assembly as claimed in claim 8, wherein said link unit further includes screws that fasten said upper and lower half parts of said tube supporting portion to said first and second ends of two adjacent ones of said supporting tubes.

* * * * *